United States Patent
Lim et al.

(10) Patent No.: US 9,980,202 B2
(45) Date of Patent: *May 22, 2018

(54) ACCESS ADMISSION CONTROL METHOD AND SYSTEM FOR MOBILE COMMUNICATION SYSTEM

(71) Applicant: Samsung Electronics Co., Ltd., Gyeonggi-do (KR)

(72) Inventors: Chae Gwon Lim, Seoul (KR); Han Na Lim, Seoul (KR); Sung Ho Choi, Gyeonggi-do (KR); Tae Sun Yeoum, Seoul (KR); Eun Hui Bae, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 77 days.

This patent is subject to a terminal disclaimer.

(21) Appl. No.: 14/672,904

(22) Filed: Mar. 30, 2015

(65) Prior Publication Data

US 2015/0208322 A1 Jul. 23, 2015

Related U.S. Application Data

(63) Continuation of application No. 12/564,130, filed on Sep. 22, 2009, now Pat. No. 9,019,887.

(30) Foreign Application Priority Data

Sep. 25, 2008 (KR) .................. 10-2008-0094099

(51) Int. Cl.
*H04W 48/04* (2009.01)
*H04W 4/08* (2009.01)
(Continued)

(52) U.S. Cl.
CPC ............ *H04W 48/04* (2013.01); *H04W 4/08* (2013.01); *H04W 8/04* (2013.01); *H04W 48/02* (2013.01);
(Continued)

(58) Field of Classification Search
CPC ............... H04W 84/045; H04W 12/08; H04W 36/0055; H04W 92/12; H04W 48/02; H04W 4/08; H04L 63/101; H04L 63/104
See application file for complete search history.

(56) References Cited

U.S. PATENT DOCUMENTS 7,729,697 B2   6/2010   Scheinert et al.
7,738,922 B2   6/2010   Hashimoto et al.
(Continued)

FOREIGN PATENT DOCUMENTS

CN   101136826 A   3/2008
CN   101272618 A   9/2008
(Continued)

OTHER PUBLICATIONS

Niemi, et al.; "HTTP Digest Authentication Using AKA"; RFC 3310, Sep. 2002.
(Continued)

*Primary Examiner* — Ian N Moore
*Assistant Examiner* — Brian T Le
(74) *Attorney, Agent, or Firm* — Cha & Reiter, LLC

(57) ABSTRACT

An access admission control method and system for and SAE/LTE system is provided for determining whether to accept or reject an access of a User Equipment (UE) to a Home evolved Node B (HeNB) based on the subscriber information of the UE. In an access admission control method according to the present invention, a HeNB or HeNB Gateway (HGW) transmits, when an access request message is received from a UE, the access request message
(Continued)

to a Mobility Management Entity (MME) together with a CSG ID of the HeNB, and the MME determines, whether to accept or reject the access of the UE to the HeNB based on whether the CSG ID is contained in a white list associated with the UE.

6 Claims, 4 Drawing Sheets

(51) Int. Cl.
    *H04W 48/02*     (2009.01)
    *H04W 8/04*     (2009.01)
    *H04W 84/04*     (2009.01)
    *H04W 88/00*     (2009.01)
    *H04W 88/08*     (2009.01)

(52) U.S. Cl.
    CPC ........ *H04W 84/045* (2013.01); *H04W 88/005* (2013.01); *H04W 88/08* (2013.01)

(56) References Cited

U.S. PATENT DOCUMENTS

| | | | |
|---|---|---|---|
| 8,280,373 | B2 | 10/2012 | Huggett et al. |
| 2002/0119796 | A1 | 8/2002 | Vanghi |
| 2004/0162077 | A1* | 8/2004 | Kauranen et al. ............ 455/445 |
| 2004/0224688 | A1 | 11/2004 | Fischer |
| 2007/0113086 | A1 | 5/2007 | Huang et al. |
| 2007/0253359 | A1 | 11/2007 | Hall et al. |
| 2007/0254620 | A1 | 11/2007 | Lindqvist et al. |
| 2007/0270152 | A1 | 11/2007 | Nylander et al. |
| 2008/0188247 | A1 | 8/2008 | Worrall |
| 2008/0227447 | A1 | 9/2008 | Jeong et al. |
| 2008/0267153 | A1 | 10/2008 | Mukherjee et al. |
| 2009/0047960 | A1 | 2/2009 | Gunnarsson et al. |
| 2009/0111428 | A1 | 4/2009 | Blommaert et al. |
| 2009/0270096 | A1 | 10/2009 | Somasundaram et al. |
| 2009/0305671 | A1 | 12/2009 | Luft et al. |
| 2009/0305699 | A1 | 12/2009 | Deshpande et al. |
| 2009/0325634 | A1 | 12/2009 | Bienas et al. |
| 2010/0081413 | A1 | 4/2010 | Bernard et al. |

FOREIGN PATENT DOCUMENTS

| | | |
|---|---|---|
| CN | 101272621 | 9/2008 |
| EP | 0 750 440 A2 | 12/1996 |
| GB | 2 445 004 A | 6/2008 |
| JP | 6-245255 A | 9/1994 |
| JP | 8-172667 A | 7/1996 |
| JP | 2005-109570 A | 4/2005 |
| JP | 2006-254080 A | 9/2006 |
| JP | 2007-166670 A | 6/2007 |
| JP | 2007-534227 A | 11/2007 |
| RU | 2 295 200 C2 | 3/2007 |
| WO | 00/54537 A2 | 9/2000 |
| WO | 2007/027032 A1 | 3/2007 |
| WO | 2007/040449 A1 | 4/2007 |
| WO | 2007/124218 A2 | 11/2007 |
| WO | 2008/047041 A2 | 4/2008 |
| WO | 2008/062200 A2 | 5/2008 |

OTHER PUBLICATIONS

Telecom Italia, Huawei, Qualcomm; "Pseudo-CR on Allowed CSG List Update—3GPP TR 24.801 V1.1.1"; 3GPP TSG CT WG1 Meeting #55; Aug. 18-22, 2008; C1-083427.
Qualcomm Europe; "Principles of Access Control for CSG Cells"; 3GPP TSG CT WG1 Meeting #55; Aug. 18-22, 2008; 2pgs.
Deshpande et al.; "Systems and Methods for Registration and Access Control in Femtocell Deployments"; Qualcomm, Specification, Drawing, Appendix 1 and 2; Jun. 6, 2008.
Blommaert et al.; "System and Method for Authenticating a Context Transfer"; Nokia Corporation; Specification, Drawing; Oct. 29, 2007.
Huawei, Discussion on CSG Mobility List and TA List, 3GPP Draft; C1-083437, 3rd Generation Partnership Project (3GPP), Mobile Competence Centre; 650, Route Des Lucioles; F-06921 Sophia-Antipolis Cedex; France, No. Budapest, Hungary; Aug. 22, 2008, XP050308632.
European Search Report dated Apr. 29, 2016.
Chinese Search Report dated Oct. 10, 2016.
Rel-8 Closed Subscriber Group support for Home NodeB/eNodeB; 3GPP TSG SA WG2 Meeting #67; Aug. 25-29, 2008.
European Search Report dated Jun. 28, 2017.

* cited by examiner

ACCESS ADMISSION CONTROL METHOD AND SYSTEM FOR MOBILE COMMUNICATION SYSTEM

CROSS REFERENCE TO RELATED APPLICATIONS

The present application is a Continuation of U.S. patent application Ser. No. 12/564,130 filed on Sep. 22, 2009, which claims the benefit of priority under 35 U.S.C. § 119(a) of an application entitled "ACCESS ADMISSION CONTROL METHOD AND SYSTEM FOR MOBILE COMMUNICATION SYSTEM" filed in the Korean Intellectual Property Office on Sep. 25, 2008 and assigned Serial No. 10-2008-0094099, the contents of which are incorporated herein by reference.

BACKGROUND

1. Field of the Invention

The present invention relates to mobile communication systems and, in particular, to an access admission control method and system for determining access to a SAE/LTE (System Architecture Evolution/Long Term Evolution) system.

2. Description of the Related Art

In a conventional Wideband Code Division Multiple Access (WCDMA) mobile communication system, a node B refers to a network component operating as a base station for securing the coverage of an operator's network. Recently, Node B base stations have been installed to cover a shadow area or at the customer premise to allow access to a $3^{rd}$ Generation (3G) core network via a public Internet Protocol (IP) network, e.g., Ethernet and Asymmetric Digital Subscriber Line (ADSL). Such a base station is referred to as a "femto base station," and the cell served by the femto base station is referred to as a femto cell. Particularly, the in-home evolved Node B base station is referred to as a Home Node B (HNB) in the WCDMA system. Unlike the conventional Node B, the HNB is able to allow access of only the user equipment (UE) registered for the HNB utilization. This is called "admission control."

FIG. 1 is a sequence diagram illustrating operations when an UE attempts to access the HNB.

Referring to FIG. 1, the HNB/HGW (HNB Gateway) 102 acquires the UE identification information, i.e. International Mobile Subscriber Identity (IMSI) through OA&M (Operations, Administration, and Maintenance) processes (104). OA&M processes are well-known in the art and need to be described in detail herein.

The UE 100 sends the HNB/HGW 102 a Non Access Stratum (NAS) Request message containing its IMSI to request access to the HNB (106). The NAS can be a messaging protocol used for signaling and traffic between the UE and a Core Network (CN) in the Universal Mobile Telecommunications System (UMTS), e.g. Attach or Routing.

Upon receipt of the NAS request message containing the IMSI of the UE, the HNB/HGW 102 checks whether the IMSI exists in an IMSI list (108). If the IMSI exists in the IMSI list, i.e. the UE 100 is allowed access to the HNB. The HNB/HGW 102 sends the UE 100 a NAS Accept message (110) in response to the NAS Request message (106), whereby the UE accesses the HNB successfully for the next operation. Otherwise, if the IMSI of the UE 100 does not exist in the IMSI list, i.e. if the UE 100 is rejected from accessing the HNB, the HNB/HGW 108 sends the UE 100 a NAS Reject message (112).

As described above, the HNB/HGW (102), whether physically independent or combined, performs the admission control process based on the IMSI in the conventional WCDMA system such that the either the HNB or the HGW must have the IMSI information to determine whether to accept or reject the UE from accessing the network. That is, the operator inserts the IMSI information of allowed UEs into either the HNB or the HGW (or both) manually. However, storing the security-sensitive IMSI information of the subscriber within an entity located on the public IP network is prone to cause security problems, and frequent update of the IMSI list increases maintenance cost.

SUMMARY

The present invention provides an admission control method and system for determining whether to accept or reject the access of a UE to an Home evolved Node B (HeNB) in a SAE/LTE system enabling efficient control of the access attempt of the UE to the network. In an exemplary embodiment of the present invention, the HeNB or the HGW receives an access request message transmitted by a UE and forwards the access request message to an Mobility Management Entity (MME) together with its Closed Subscriber Group Identity (CSG ID) such that the MME can determine whether to accept or reject the access of the UE to the HeNB based on a white list stored in its storage unit. In case that the MME does not have the white list of the UE, it can request a Home Subscriber Server (HSS) or another MME for the white list of the UE. The MME may then determine whether to accept or reject the access of the UE to the HeNB based on the white list received from the HSS or another MME.

In accordance with an exemplary embodiment of the present invention, an access admission control method for a mobile communication system including a mobile terminal, a base station, and a network access controller includes transmitting, at the mobile terminal, an access request message to the base station; forwarding, at the base station, the access request message to the network access controller together with a base station identifier of the base station; and accepting, at the network access controller, access of the mobile terminal to the base station when the base station identifier is contained in a white list of the mobile terminal.

In accordance with another exemplary embodiment of the present invention, an access admission control method for a Long Term Evolution (LTE) mobile communication system including a mobile terminal, a femto base station, and a Mobility Management Entity (MME) includes transmitting, at the mobile terminal, a Non Access Stratum (NAS) request message to the femto base station; forwarding, at the femto base station, the NAS request message to the MME with a Closed Subscriber Group Identity (CSG ID) of the femto base station; and accepting, at the MME, access of the mobile terminal to the femto base station when the CSG ID is contained in a white list of the mobile terminal.

In accordance with another exemplary embodiment of the present invention, an access admission control method for a mobile communication system in which a network access controller controls access of a mobile terminal to a base station includes receiving, at the network access controller, a Closed Subscriber Group Identity (CSG ID) of the base station and a Non Access Stratum (NAS) request message transmitted by the mobile terminal; and accepting access of the mobile terminal to the bases station when the CSG ID is contained in a white list of the mobile terminal.

In accordance with another exemplary embodiment of the present invention, an access admission control system includes a User Equipment (UE) which transmits an access request message; a Home evolved Node B (HeNB) which receives the access request message transmitted by the UE and forwards the access request message together with a Closed Subscriber Group Identity (CSG ID) of the HeNB; and a Mobility Management Entity (MME) which receives the access request message and the CSG ID and determining whether to accept or reject the access of the UE based on the a white list contained in subscriber information of the UE.

BRIEF DESCRIPTION OF THE DRAWINGS

The above features and advantages of the present invention will be more apparent from the following detailed description in conjunction with the accompanying drawings, in which.

DETAILED DESCRIPTION

Figure 1:
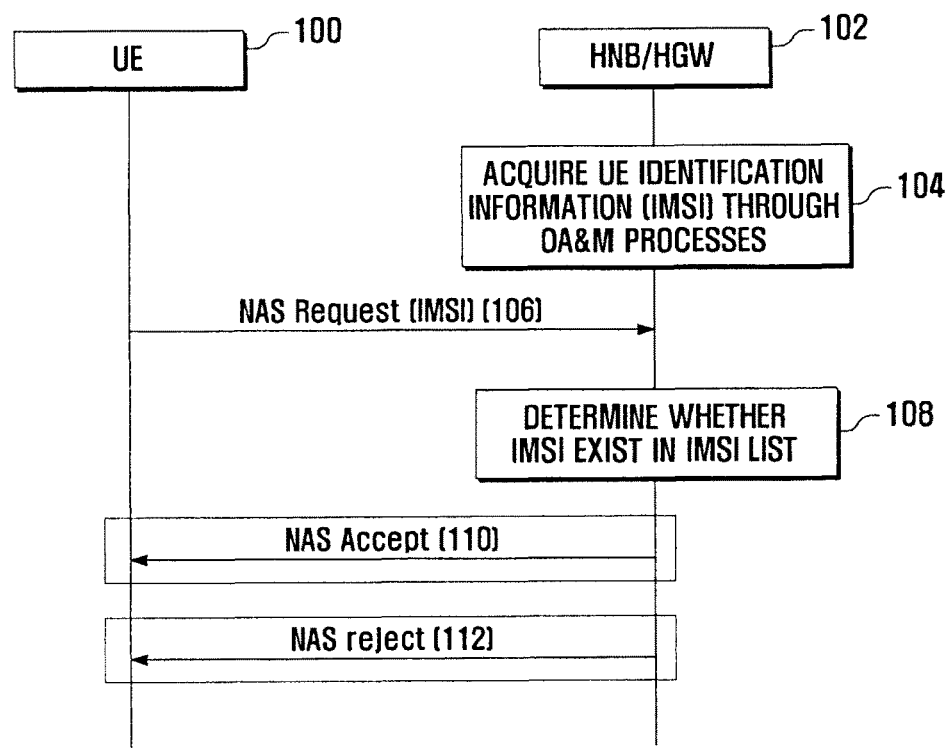
FIG. 1 is a sequence diagram illustrating operations when an UE attempts to access the HNB.

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention. The terms and words used in this specification and claims shall not be understood as limited to the lexical meaning. Based on the principle that an inventor can adequately define terms to best describe his/her invention, the terms and words shall be interpreted as conforming to the technical spirit of the present invention. Accordingly, the examples and drawings disclosed in the specification are only exemplary ones and there may be various equivalents and modifications at the time of the application for patent of this invention.

In the following descriptions, the term "mobile communication system" can denote any of a plurality of communication systems such as System Architecture Evolution/Long Term Evolution (SAE/LTE) system, Universal Mobile Telecommunications System (UMTS), and Code Division Multiple Access (CDMA) systems. The term "base station" can denote any of base station controller and gateway. The terms femtocell, Home eNode B (HeNB), Home Node B (HNB), and evolved Node B (eNB) are used synonymously throughout the following descriptions. The terms Home eNode B gateway, Home Node B gateway, eNode B gateway, HGW, and EGW are used synonymously throughout the following descriptions. In the following descriptions, the term "network access controller" can denote any of Mobility Management Entity (MME), Mobile Switching Center (MSC), Serving Gateway Service Network (SGSN), and their equivalents. In the following description, the term "user information storage" can denote any of Home Subscriber Server (HSS) and Home Location Register (HLR).

In an exemplary embodiment, the present invention is described in association with a SAE/LTE system comprising HeNB/HGW as a base station, an MME as a network access controller, and an HSS as an user information storage. Although the admission control method and system is described in association with an LTE system in the exemplary embodiments of the present invention, it can be applied to other types of mobile communication systems.

In an exemplary embodiment of the present invention, the UE attempts to access the HeNB via a Non Access Stratum (NAS) message. For instance, the HeNB always broadcasts its base station identifier through its radio carrier. When the UE receives a paging message from the network or wants to transmit data in idle mode or location update is required, the UE attempts to access the HeNB with a NAS request message. Then, the HeNB forwards the NAS request message to the network access controller with its base station identifier. The base station identifier can be a Closed Subscriber Group Identity (CSG ID). The network access controller can store allowed CSG lists per UE which contains the CSG identities of allowed cells. In an exemplary embodiment of the present invention, the allowed base station identity list is called a "white list." In case that the network access controller has no white list, it can request the user information storage or another network access controller on the network to which the UE had been connected previously.

The present invention provides a method for controlling UE's access to the HeNB in the SAE/LTE system in which the Mobility Management Entity (MME), as a Core Network Entity, determines whether to accept or reject the UE's access to the HeNB based on the subscriber information of the UE.

In the SAE/LTE system, the white list can be stored in a Universal Subscriber Identity Module (USIM). The white list contains all the CSG Identities of the CSGs to which the subscriber belongs, and the CSG identity (CSG ID) is used by the UE to identify the HeNB. That is, the UE is allowed to access the HeNB whose CSG ID is contained in the white list. For some exceptional cases, i.e, manual HeNB cell selection by the user, the UE can try to access the HeNB whose CSG ID is not in its white list. In order to cope with a situation in which the UE is malfunctioning or attempts to access a HeNB that is not allowed to the UE, an admission control is required on the network side.

In an exemplary embodiment of the present invention, the Mobility Management Entity (MME) is proposed as a network entity for the admission control. When an access request message is received from the UE, the HeNB forwards a NAS request message together with its own CSG ID to the MME. The MME analyzes the subscriber information of the UE and sends a NAS response message indicative an acceptance or a rejection of the access to the UE in response to the NAS request message. That is, when the MME has subscriber information including the white list of the corresponding UE, it determines whether to accept or reject the UE' access to the HeNB based on the white list of the UE. In case that the MME has no subscriber information of the UE, it requests the Home Subscriber Server (HSS) or another MME to send the subscriber information of the UE to determine whether to accept or reject the UE's access to the HeNB.

In an exemplary embodiment of the present invention, the Home Gateway (HGW) is located between the HeNB and the Core Network (CN) and can have some functions of the HeNB. These functions can include subscriber authentication and location registration. That is, the functions of the HeNB can be separated to be implemented with the HGW. For this reason, it is noted that the HNB is identical with HNB/HGW in functionality in an exemplary embodiment of the present invention.

Figure 2:
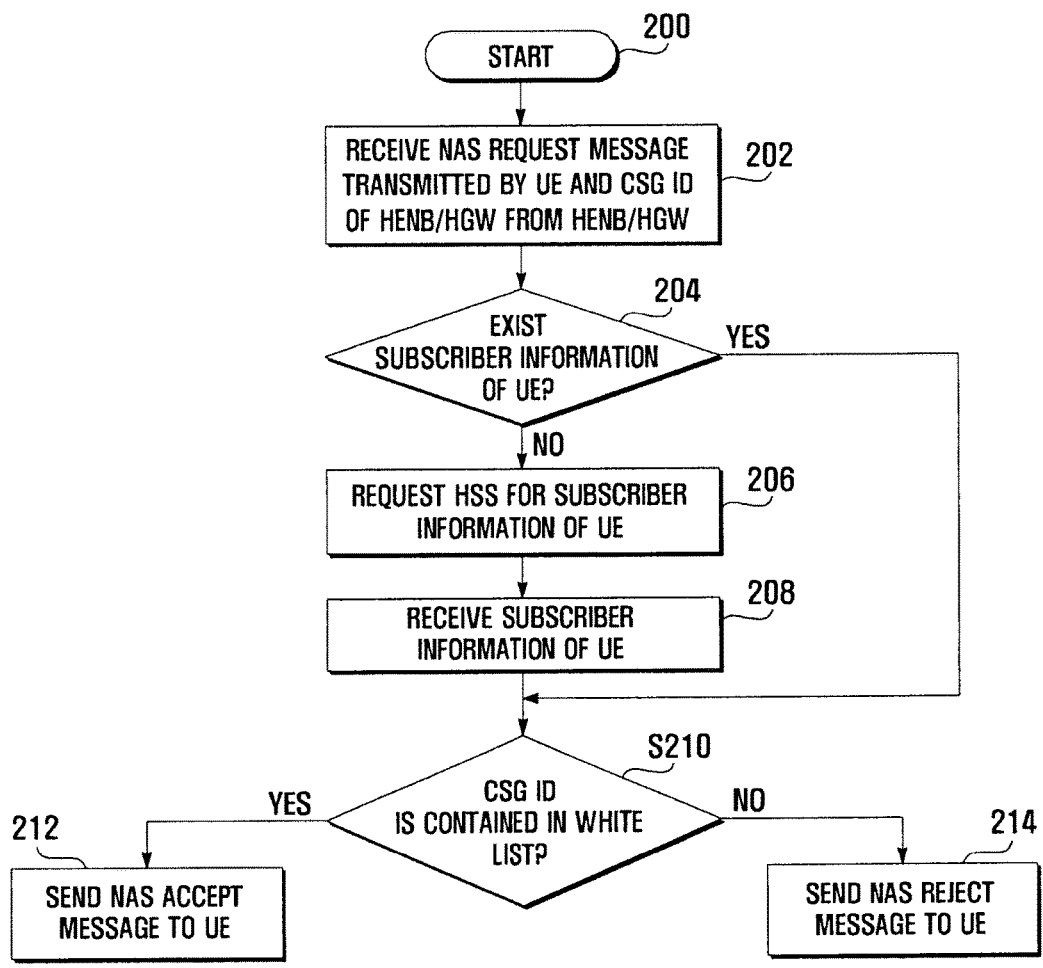
FIG. 2 is a flowchart illustrating an admission control method for determining whether to accept or reject an access attempt of UE to the HeNB in a SAE/LTE system according to an exemplary embodiment of the present invention.

FIG. 2 is a flowchart illustrating an admission control method for determining whether to accept or reject an access attempt of an UE to an HeNB in a SAE/LTE system according to an exemplary embodiment of the present invention.

Referring to FIG. 2, the MME receives a NAS request message forwarded by the HeNB/HGW together with the CSG ID of the HeNB/HGW, the NAS request message being transmitted by a UE (S202). Here, the HGW can be a network entity installed between the HeNB and the Core Network and has some functions of the HeNB. The HeNB/HGW is identical with the HNB/HGW of FIG. 1 in functionality. The NAS message can be an Attach request message, a Tracking Area Update (TAU) request message, or a Service Request message.

Upon receipt of the NAS message and CSG ID, the MME determines whether the subscriber information of the UE (subscription data containing the white list) exists in its storage (S204). In an exemplary embodiment of the present invention, the subscriber information of the UE can include the white list containing the CSG IDs of the CSGs to which the subscriber has access. If the subscriber information of the UE does not exist (i.e. if the MME has no white list of the UE), the MME requests the HSS or another MME which has the UE context for the subscriber information (subscription data including white list) (S206). Next, the MME receives the subscriber information (subscription data including white list) transmitted by the HSS or the other MME (S208). The MME checks, upon receipt of the NAS request message, whether the subscriber information (subscription data including white list) of the UE and requests, when no subscriber information of the UE exists, the HSS or another MME to send the subscriber information of the UE. If the subscriber information of the UE is retrieved from its storage at step 204 or received from the HSS or other MME at step 208, the MME determines whether the CSG ID of the HeNB/HGW is contained in the white list of the UE (S210). If the CSG ID of the HeNB/HGW is contained in the white list of the UE, the MME sends a NAS accept message to the UE (S212). Otherwise, if the CSG ID of the HeNB/HGW is not contained in the white list of the UE, the MME sends a NAS reject message to the UE (S214).

Figure 3:
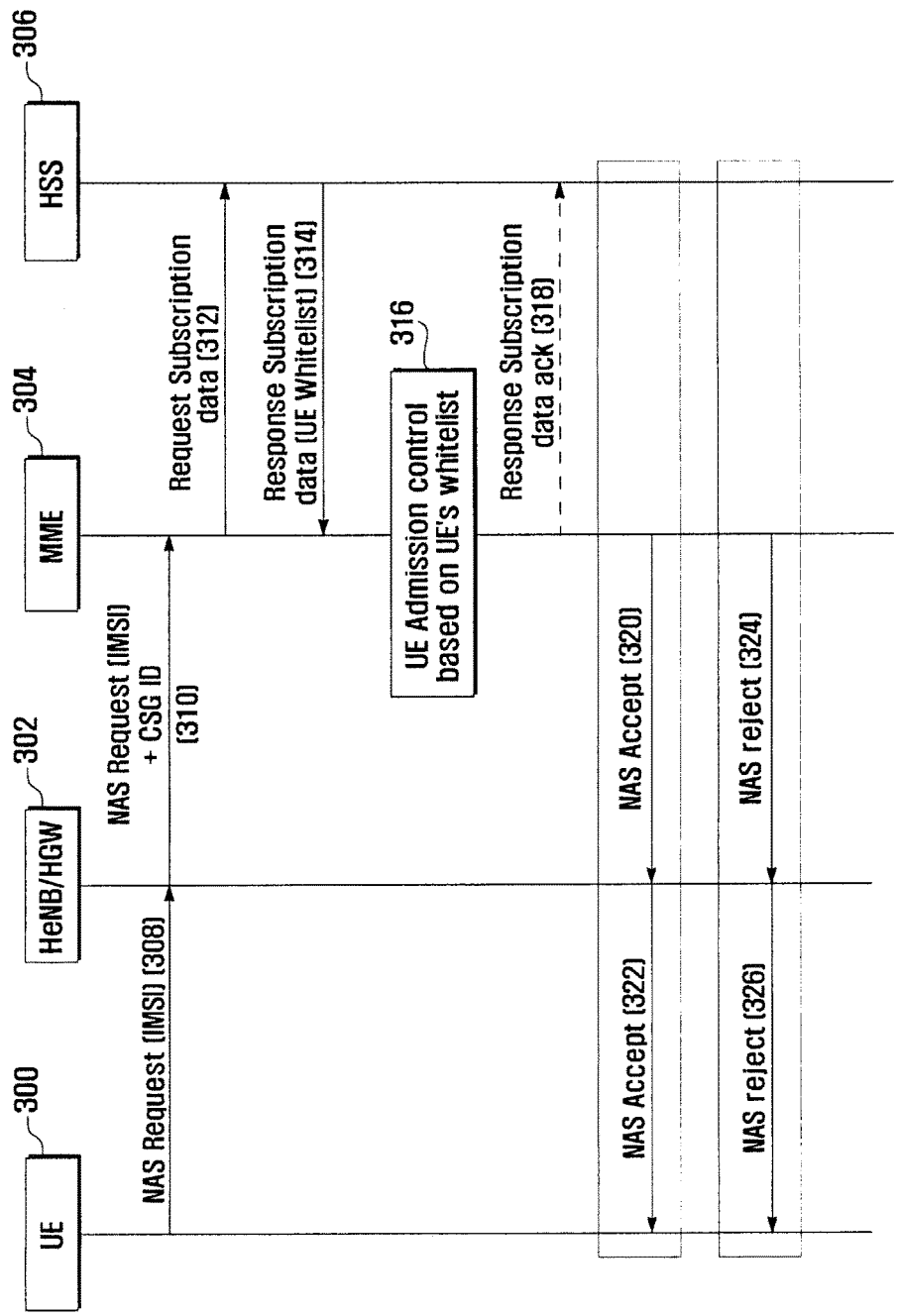
FIG. 3 is a sequence diagram illustrating operations when a UE attempts to access a HeNB in an admission control system according to an exemplary embodiment of the present invention.

FIG. 3 is a sequence diagram illustrating an exemplary operation when a UE attempts to access a HeNB in an admission control system according to an exemplary embodiment of the present invention.

Referring to FIG. 3, a UE 300 sends a NAS Request message containing an IMSI stored in the USIM inside the UE 300 to a HeNB/HGW 302 (308). If the UE is allocated a temporary identifier from the network, the temporary identifier can be included in the NAS Request message instead of the IMSI. The HeNB/HGW 302 forwards the NAS Request message to an MME 304 together with its CSG ID (310). Upon receipt of the NAS Request message and the CSG ID of the HeNB/HGW 302, the MME 304 determines whether to accept or reject the access of the UE through the procedure as shown in FIG. 2. That is, the MME 304 determines whether the subscriber information (white list) of the UE 300 exists in its storage and, if no subscriber information of the UE 300 exists, acquires the subscriber information of the UE 300 from the HSS 306 or another MME (not shown). If the white list of the UE 300 is not stored in the MME 304, the MME 304 sends a Response Subscription data message to the HSS 306 or UE context request message to another MME (not shown) to request for the subscriber information (subscription data) (312). In response to Response Subscription data message, the illustrated HSS 306 sends a Response Subscription data message containing the subscriber information (including white list) of the UE 300 to the MME 304 (314). In one aspect of the invention, the MME 304 can send an acknowledgement message to the HSS 306 or another MME in response to the requested UE Subscription data (318).

After acquiring the subscriber information including the white list of the UE 300, the MME 304 determines whether to accept or reject the access of the UE 300 on the basis of the white list of the UE 300 (316). That is, if the CSG ID of the HeNB/HGW 302 is contained in the white list of the UE 300, the MME 304 sends a NAS accept message to the HeNB/HGW 302 (320), and the HeNB/HGW 302 forwards the NAS accept message to the UE 300 (322). Otherwise, if the CSG ID of the HeNB/HGW 302 is not contained in the white list of the UE 300, the MME 304 sends a NAS Reject message to the HeNB/HGW 302 (324), and the HeNB/HGW 302 forwards the NAS Reject message to the UE 300 (326).

The illustrated procedure (attach procedure) is performed when the UE tries to access the network with transmission of a Attach request message, a Tracking Area Update (TAU) request message, or a Service Request message. It is noted that the processes such as the bearer configuration and attach process using old GUTI that are out of the scope of the present invention are omitted.

Figure 4:
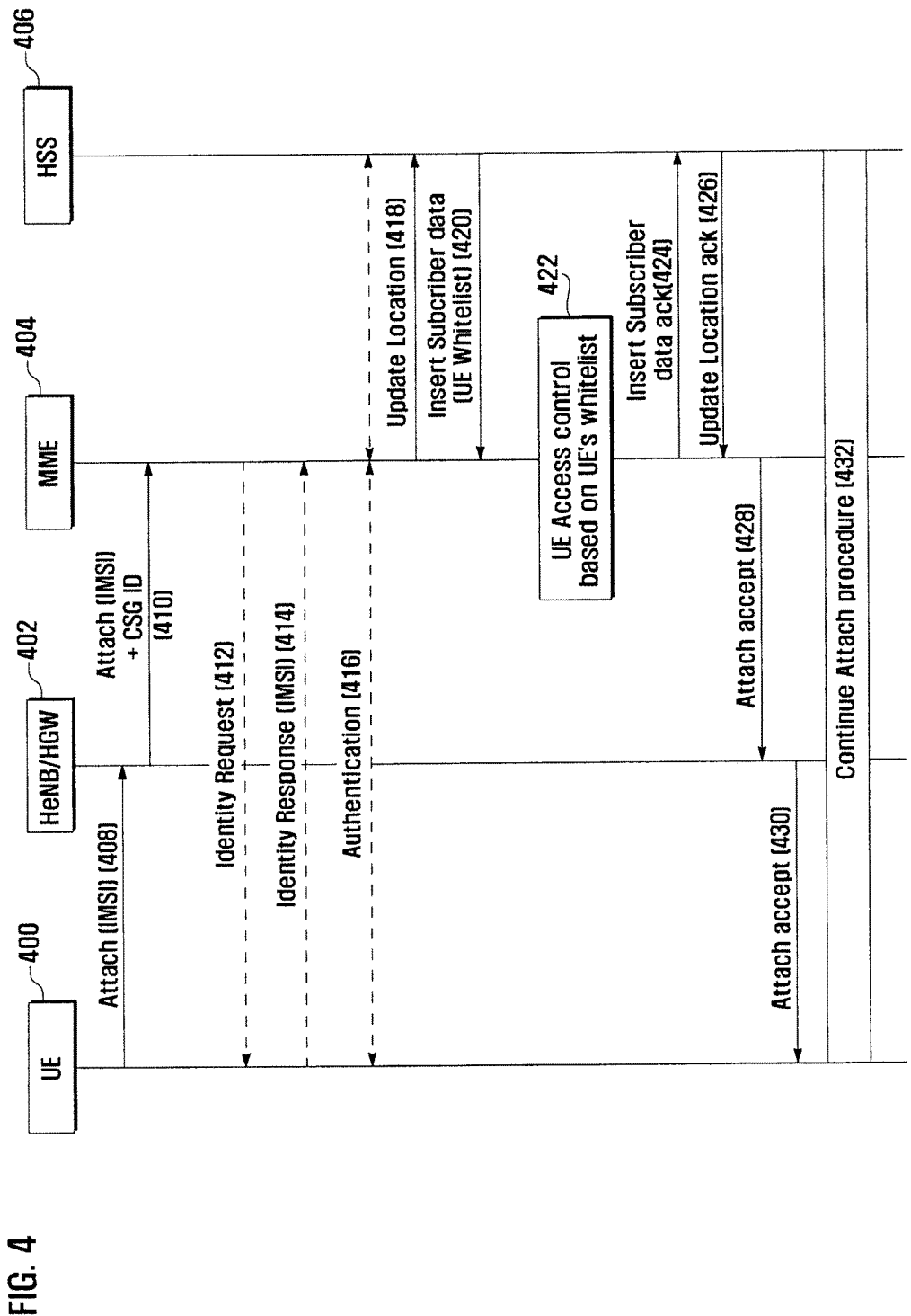
FIG. 4 is a sequence diagram illustrating operations when a UE attempts to attach a HeNB in a SAE/LTE system according to an exemplary embodiment of the present invention.

Referring to FIG. 4, a UE 400 sends an Attach message containing its IMSI to the HeNB/HGW 402 (408). The HeNB/HGW 402 forwards the Attach message to an MME 404 together with its CSG ID (410). In FIG. 4, steps 412 to 416 are the UE authentication process and need not be discussed in detail to with regard to describing the present invention.

Upon receipt of the Attach message and the CSG ID of the HeNB/HGW 402, the MME 404 sends an Update Location message to HSS 406 (418). In response to the Update Location message, the HSS 406 sends an Insert Subscriber data message containing the white list of the UE 400 to the MME 404 (420). Upon receipt of the Insert Subscriber data message, the MME 404 checks whether the CSG ID of the HeNB/HGW 402 is contained in the white list of the UE 400 (422). In an exemplary embodiment of the present invention, it is assumed that the CSG ID of the HeNB/HGW 402 is contained in the white list of the UE 400. If the CSG ID of the HeNB/HGW 402 is contained in the white list of the UE 400 received from the HSS 406, the MME 404 sends an Insert Subscriber data ACK message to the HSS 406 in response to the Insert Subscriber data message (424). Upon receipt of the Insert Subscriber data ACK message, the HSS 406 sends an Update Location ACK message to the MME 404 in response to the Update Location message (426). It is worth noting that the subscriber data can be delivered in Update Location ACK without steps 420 and 424. In this case, step 422 will occur after step 426. When the Update Location ACK message is received, the MME 404 sends an Attach accept message to the HeNB/HGW 402 (428), and the HeNB/HGW 402 forwards the Attach accept message to the UE 400 (430). In consequence, the UE 400, HeNB/HGW 402, MME 404, and HSS 406 continue Attach procedure (432).

Although the present invention has been described with regard to an NAS message, with would be recognized by those skilled in the art that the NAS messages can also be replaced with other types of messages designed for the same function in an exemplary embodiment of the present invention.

As described above, the admission control method and system for determining whether to accept or reject access of a UE to an HeNB in a SAE/LTE system provides for efficiently control of the access attempt of the UE to the network. In an exemplary embodiment of the present invention, the HeNB (HNB) or HGW receives the access request message, forwards the access request message to an MME together with its CSG ID such that the MME can determines whether to accept or reject the access of the UE to the HeNB (HNB) based on the white list associated with the UE that is stored in its storage or received from an HSS or another MME.

As described above, the access admission control method and system for mobile communication system according to the present invention determines whether to accept or reject the access of the UE to the HeNB based on the white list of the UE, thereby controlling access of the UE to the HeNB efficiently.

The above-described methods according to the present invention can be realized in hardware or via the execution of software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method for access control by a mobility management entity (MME), the method comprising:
   receiving, from a base station, a first message including an attach request message of a terminal and a closed subscriber group identifier (CSG ID), the attach request message being related to a non access stratum (NAS) protocol and including an identifier of the terminal;
   requesting, by the MME, subscription information including a list of CSG IDs from a home subscriber server (HSS), if there is no valid subscription information including the list of CSG IDs in the MME;
   receiving, by the MME, the subscription information including the list of CSG IDs from the HSS;
   determining whether the CSG ID is contained in the list of CSG IDs in the subscription information in the MME;
   transmitting, to the base station, a second message including an attach reject message if the CSG ID is not contained in the subscription information, the attach reject message being related to the NAS protocol; and
   transmitting, to the base station, a third message including an attach accept message if the CSG ID is contained in the subscription information.

2. A mobility management entity (MME) for access control, the MME comprising:
   a processor in communication with a memory, the memory including code which when executed by the processor causes the MME to:
   receive, from a base station, a first message including an attach request message of a terminal and a closed subscriber group identifier (CSG ID), the attach request message being related to a non access stratum (NAS) protocol and including an identifier of the terminal,
   request subscription information including a list of CSG IDs from a home subscriber server (HSS), if there is no valid subscription information including the list of CSG IDs in the MME,
   receive the subscription information including the list of CSG IDs from the HSS, determine whether the CSG ID is contained in the list of CSG IDs in the subscription information in the MME,
   transmit, to the base station, a second message including an attach reject message if the CSG ID is not contained in the subscription information, the attach reject message being related to the NAS protocol, and
   transmit, to the base station, a third message including an attach accept message if the CSG ID is contained in the subscription information.

3. A method for access control by a base station, the method comprising:
   receiving, from a terminal, a first message including an attach request message, the attach request message being related to a non access stratum (NAS) protocol and including an identifier of the terminal;
   transmitting, to a mobility management entity (MME), a second message including the attach request message and a closed subscription group identifier (CSG ID);
   receiving, from the MME, a third message including an attach reject message if the CSG ID is not contained in a list of CSG IDs in subscription information in the MME, the attach reject message being related to the NAS protocol;
   transmitting, to the terminal, a fourth message including the attach reject message; and
   receiving, from the MME, a fifth message including an attach accept message if the CSG ID is contained in the subscription information in the MME,
   wherein before receiving the third message, if there is no valid subscription information including the list of CSG IDs in the MME, the subscription information including the list of CSG IDs is requested from a home subscriber server (HSS) by the MME.

4. A base station for access control, comprising: a processor in communication with a memory, the memory including code which when executed by the processor causes the base station to:
   receive, from a terminal, a first message including an attach request message, the attach request message being related to a non access stratum (NAS) protocol and including an identifier of the terminal,
   transmit, to a mobility management entity (MME), a second message including the attach request message and a closed subscription group identifier (CSG ID), receive, from the MME, a third message including an attach reject message if the CSG ID is not contained in a list of CSG IDs in subscription information in the MME, the attach reject message being related to the NAS protocol, transmit, to the terminal, a fourth message including the attach reject message, and receive, from the MME, a fifth message including an attach accept message if the CSG ID is contained in the subscription information in the MME, wherein before receiving the third message, if there is no valid subscription information including the list of CSG IDs in the MME, the subscription information including the list of CSG IDs is requested from a home subscriber server (HSS) by the MME.

5. A method for access control by a terminal, the method comprising:

transmitting, to a base station, a first message including an attach request message, the attach request message being related to a non access stratum (NAS) protocol and including an identifier of the terminal;

receiving, from the base station, a second message including an attach reject message if a closed subscriber group identifier (CSG ID) of the base station is not contained in a list of CSG IDs in subscription information in a mobility management entity (MME), the attach reject message being related to the NAS protocol; and receiving, from the base station, a third message including an attach accept message if the CSG ID of the base station is contained in the subscription information in the MME, wherein before receiving the second message, if there is no valid subscription information including the list of CSG IDs in the MME, the subscription information including the list of CSG IDs is requested from a home subscriber server (HSS) by the MME.

6. A terminal for access control, the terminal comprising:

a processor in communication with a memory, the memory including code which when executed by the processor causes the terminal to:

transmit, to a base station, a first message including an attach request message, the attach request message being related to a non access stratum (NAS) protocol and including an identifier of the terminal, receive, from the base station, a second message including an attach reject message if a closed subscriber group identifier (CSG ID) of the base station is not contained in a list of CSG IDs in subscription information in a mobility management entity (MME), the attach reject message being related to the NAS protocol, and receive, from the base station, a third message including an attach accept message if the CSG ID of the base station is contained in the subscription information in the MME, wherein before receiving the second message, if there is no valid subscription information including the list of CSG IDs in the MME, the subscription information including the list of CSG IDs is requested from a home subscriber server (HSS) by the MME.

* * * * *